US011867208B2

(12) United States Patent
Weiland

(10) Patent No.: US 11,867,208 B2
(45) Date of Patent: Jan. 9, 2024

(54) GAS CORE VORTEX RING GENERATOR

(71) Applicant: Christopher J. Weiland, King George, VA (US)

(72) Inventor: Christopher J. Weiland, King George, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 228 days.

(21) Appl. No.: 17/489,438

(22) Filed: Sep. 29, 2021

(65) Prior Publication Data

US 2023/0097526 A1 Mar. 30, 2023

(51) Int. Cl.
*F15D 1/00* (2006.01)

(52) U.S. Cl.
CPC ......... *F15D 1/009* (2013.01); *Y10T 137/2087* (2015.04)

(58) Field of Classification Search
CPC ........................... F15D 1/009; Y10T 137/2087
USPC ........................................................ 137/808
See application file for complete search history.

(56) References Cited

U.S. PATENT DOCUMENTS 6,482,306 B1 * 11/2002 Yager ...................... B01F 33/05
204/600
2012/0048813 A1 * 3/2012 Irvin, Sr. ................ F04D 5/001
210/512.3

* cited by examiner

*Primary Examiner* — John Bastianelli
(74) *Attorney, Agent, or Firm* — Gerhard W. Thielman

(57) ABSTRACT

A method is provided for producing a vortex ring in a liquid medium. The method includes concatenating pairs of insulated anode and cathode rings into a stack; inserting the stack into a vertically oriented chamber; disposing a cylindrical cavity below the chamber; inserting a piston into the cavity; connecting the chamber to the medium; and raising the piston to displace the medium while the stack produces an annular bubble that induces the vortex ring. In particular, the medium is water and the stack separates the medium into hydrogen and oxygen gas.

11 Claims, 6 Drawing Sheets

GAS CORE VORTEX RING GENERATOR

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to vortex ring generation. In particular, the invention relates to generation of stable annular vortices.

Vortex rings are ubiquitous in nature. Examples may be found in jellyfish and the heart: jellyfish use the mechanism for propulsion, and the heart ventricles are filled by a process in which vortex rings dominate the fluid flow. When the core is composed of the same material as the surrounding fluid, this is termed a single phase vortex ring.

There are also examples in nature of so-called gas or hollow core vortex rings—in this case the core is composed of gas, and thus a multiphase flow field is generated. Dolphins are known to "blow" gas core vortex rings and them swim through them as they frolic. Conventional mechanisms to generate hollow core vortex rings are subject to instabilities, which act to degrade their stability. It is a fundamental flaw with many generators.

SUMMARY

Conventional vortex generators yield disadvantages addressed by various exemplary embodiments of the present invention. In particular, various exemplary embodiments provide a method for producing a vortex ring in a liquid medium. The method includes concatenating pairs of insulated anode and cathode rings into a stack; inserting the stack into a vertically oriented chamber; disposing a cylindrical cavity below the chamber; inserting a piston into the cavity; connecting the chamber to the medium; and raising the piston to displace the medium while the stack produces an annular bubble that induces the vortex ring. In particular embodiments, the medium is water and the stack separates the medium into hydrogen and oxygen gas.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims. The disclosure generally employs quantity units with the following abbreviations: electric potential in volts (V), length in centimeters (cm) and mass in grams (g).

The conventional vortex ring generator denotes a piston being driven down a tube. Exemplary embodiments provide a method to create stable gas core vortex rings. The primary distinction between conventional and exemplary is the process by which gas imparts to the vortex ring. Instead of mechanically injecting gas, electrolysis is used to generate gas in the boundary layer. This drastically lowers any fluid perturbations imparted on the forming vortex ring.

Figure 1:
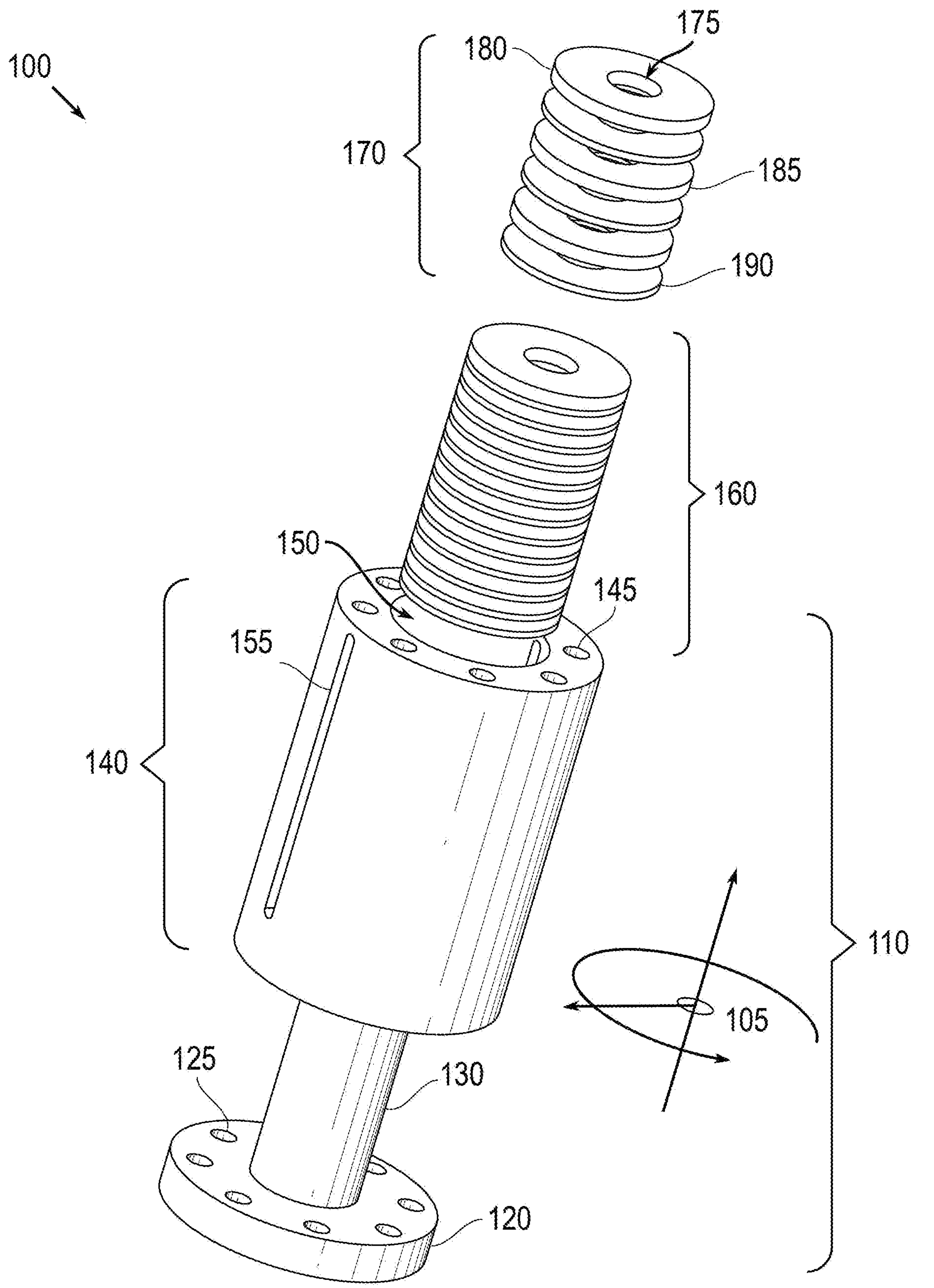
FIG. 1 is an isometric exploded view of exemplary components.

FIG. 1 shows an isometric exploded view 100 of components for the exemplary vortex generator in conjunction with a compass rose 105 for orientation with axial, radial and angular directions. Within a gravitational field, the axial direction corresponds with vertical orientation. A housing 110 includes a cylindrical base 120 with through-holes 125 along its circular periphery for mounting to a platform, a hollow column 130, and an annular chamber 140 with through-holes 145 along its circular periphery. The chamber 140 includes a circular center cavity 150 that extends parallel to the through-holes 145, and a peripheral slot 155 that exposes the cavity 150 to the column's exterior. The slot 155 enables wires to pass through from outside the housing 110 to connect the electrodes 180 and 185.

The cavity 150 contains an electrode stack 160 that comprises a concatenation 170 of elements, each containing a center cavity 175. The elements include electrodes as consecutive pairs of anodes 180 and cathodes 185 separated from each other by insulators 190. The positively charged anodes 180 and negatively charged cathodes 185 can be composed of any conductor, such as copper (Cu), whereas the insulators 190 are composed of a non-conductive material such as a polymer, such as polytetrafloroethylene (PTFE) or polyvinyl chloride (PVC). The housing 110 is comprised from plexiglas, and the holes 145 enable nut-and-bolt fasteners to secure the chamber 140 to a structure.

Figure 2A:
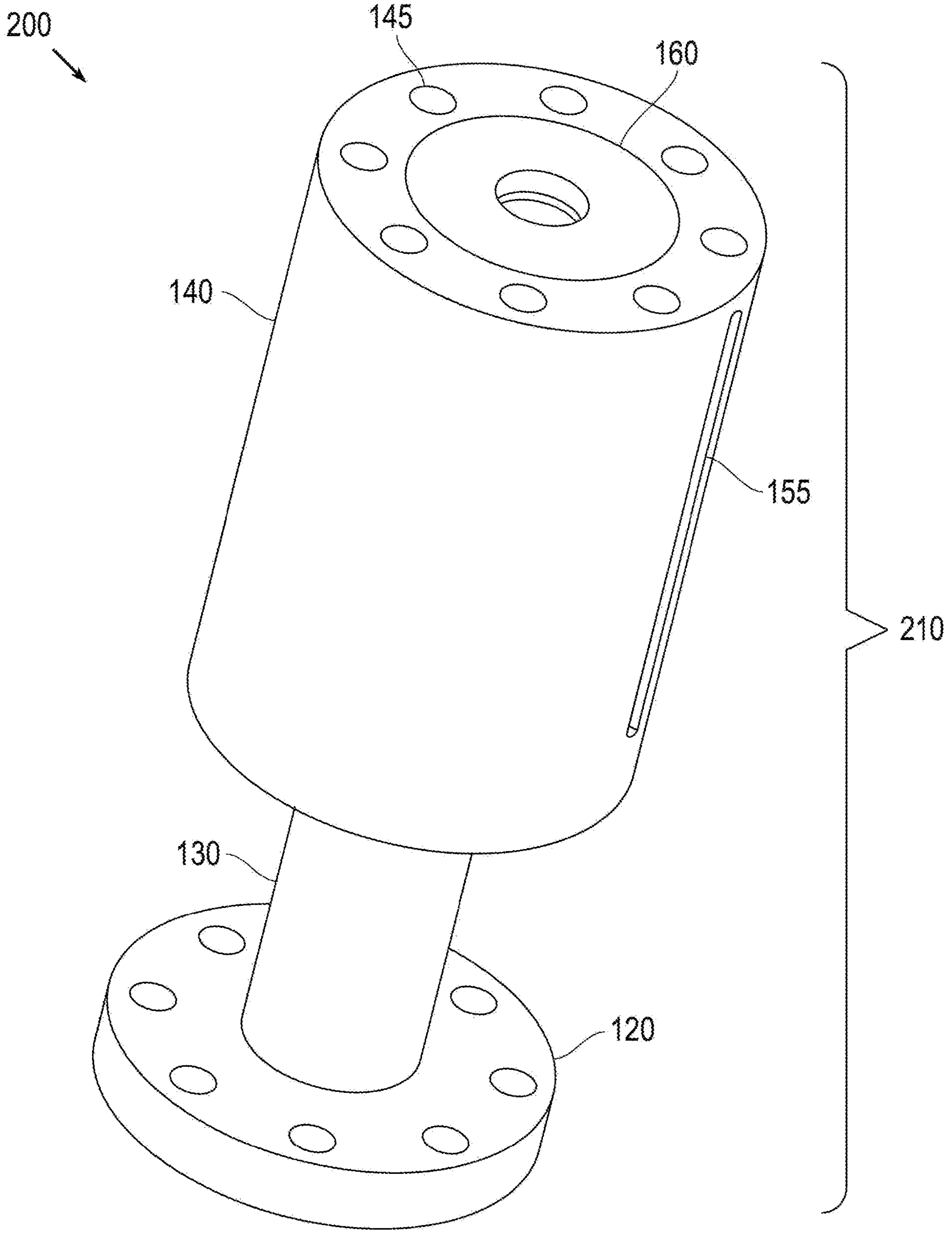
FIGS. 2A and 2B are isometric assembly views of an exemplary vortex generator.
Figure 2B:
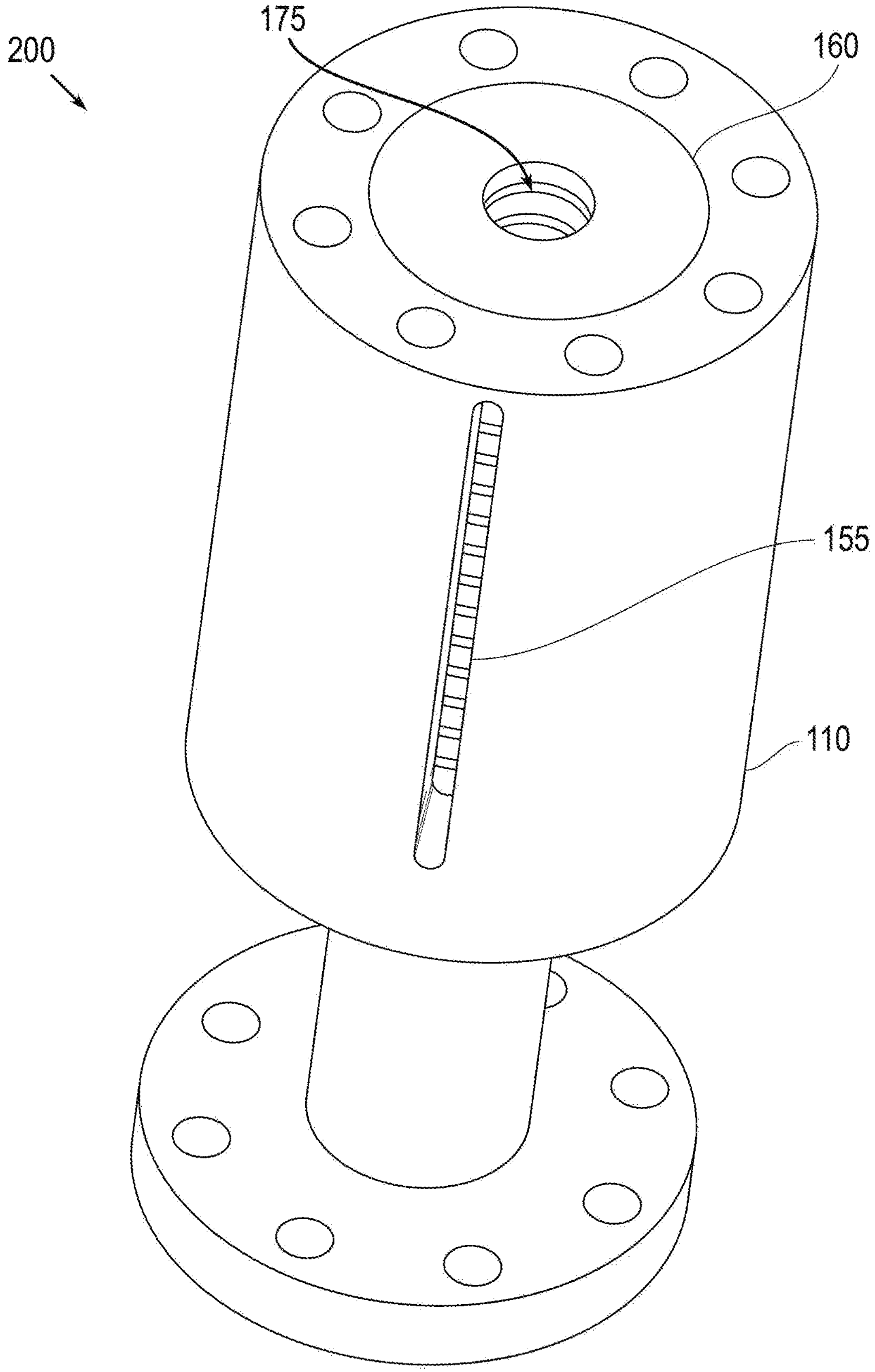

FIGS. 2A and 2B show isometric assembly views 200 of an exemplary vortex generator 210, featuring all the components from view 100 as integrated. A typical housing 110 would be about 15 cm in length and 5 cm in diameter, with a mass of 100 g, being composed of plastic or some other insulator. These dimensions are merely exemplary, and highly scalable. The anodes 180 and cathodes 185 have a respective difference potential of at least 1.23 V, while the insulators 190 are electrically neutral. Larger voltage differences yield greater bubble production.

When two electrodes disposed in a conductive fluid are energized, the cathode 185 releases electrons to hydrogen cations dissolved in the fluid to form hydrogen gas ($H_2$). At the anodes 180, oxidation commences, producing oxygen gas ($O_2$) together with electrons provided to the cathodes 185, thereby completing an electric circuit. Electron migration can also occur in pure water ($H_2O$), but adding electrolytes facilitates the process from an energy perspective.

The reduction at the cathodes 185 can be expressed as:

$$2H^{+}(aq)+2e^{-}\rightarrow 2H_2(g), \quad (1)$$

and the oxidation at the anodes 180 can be expressed as:

$$2H_2O(l)\rightarrow O_2(g)+4H^{+}(aq)+4e^{-} \quad (2)$$

where the charges are shown in superscript and phase states follow in parentheses. The result is the production of hydrogen and oxygen bubbles on or near the electrode surfaces.

The inner perimeter of each electrode represented by cavities 175 denotes the surface on which these chemical reactions occur. This contrasts with conventional arrangements, where long rods are employed as electrodes and a piston pushing against a cylindrical column generates the bubbles. For exemplary embodiments, metal electrodes 180 and 185 in the stack 160 are separated from each other by insulators 190.

Chemical reactions (1) and (2) commence upon energizing the anodes 180 and cathodes 185. The electric potential (voltage) required to practically introduce electrolysis depends on the electrolytic properties of the fluid. From a thermodynamic standpoint, a 1.23 V difference in electrical potential between the anode 180 and cathode 185 is required to induce electrolysis. In practice, higher voltage difference is used to generate more bubbles.

Figure 3A:
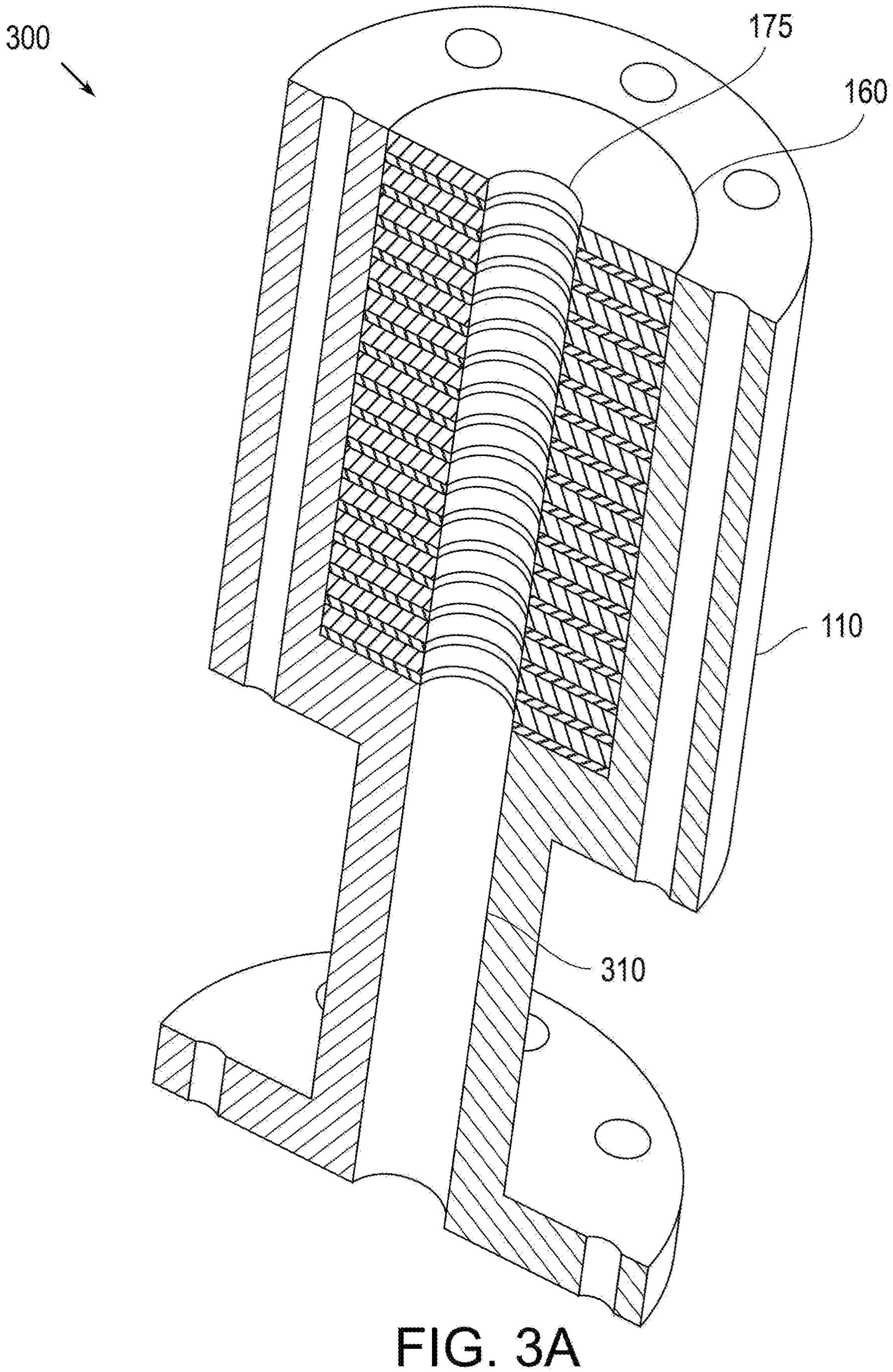
FIGS. 3A and 3B are respective isometric and elevation cross-section views of the vortex generator.
Figure 3B:
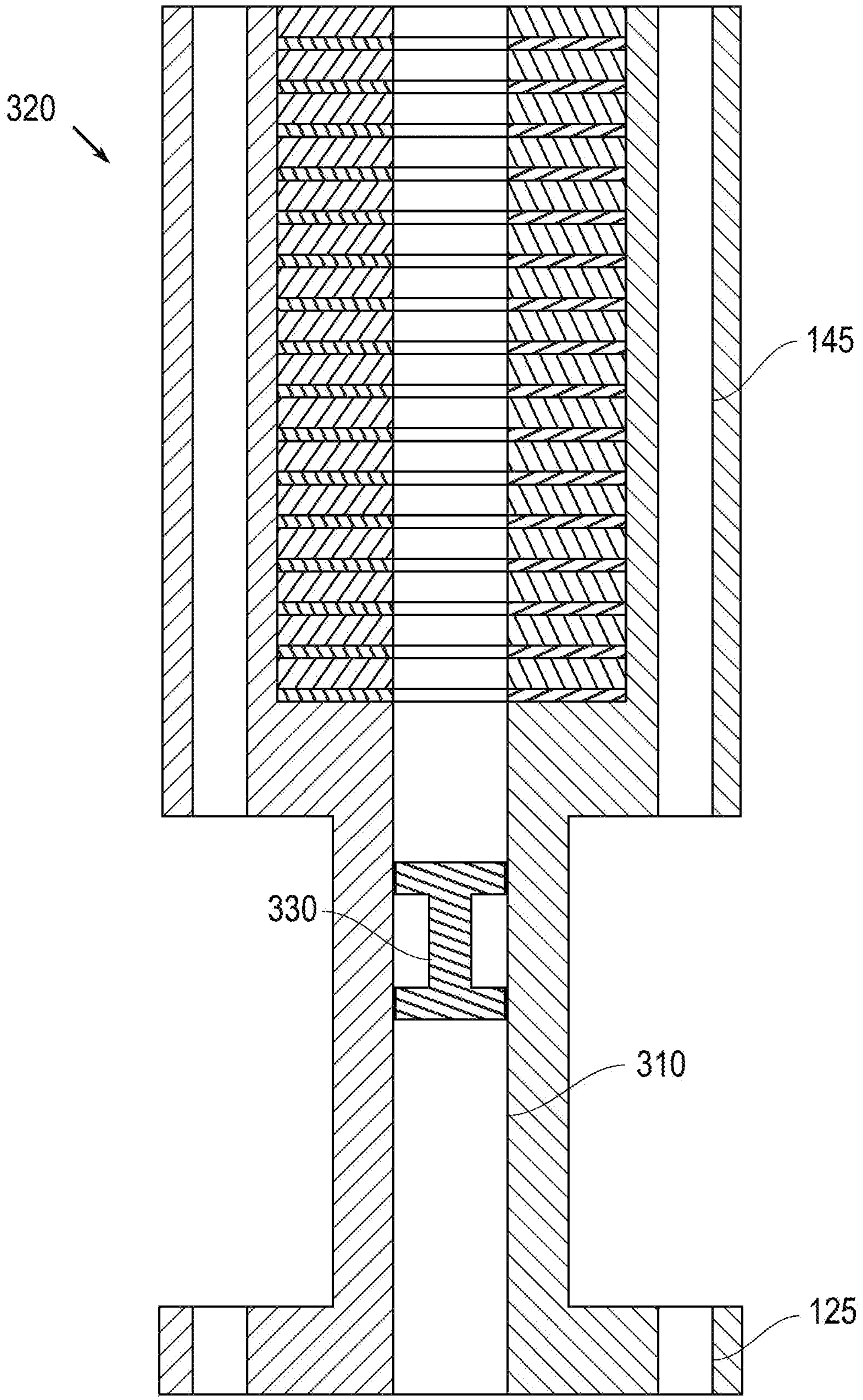

FIG. 3A shows an isometric cross-section view 300 through the longitudinal axis of the vortex generator 210. A center bore 310 extends through the column 130 and into the chamber 140 to join the cavity 150. Together with the concatenated cavities 175 of the elements concatenation 170, the bore 310 forms an extended and continuous axial channel along the length of the generator 210. FIG. 3B shows an elevation cross-section view 320 of the vortex generator 210. The bore 310 contains a piston 330 that can traverse axially from the base 120 to the chamber 140. The piston 330 can be connected to an actuator (not shown) to move independently of the housing 110 along that axis. The void behind the piston 330 would be filled from an ambient source to negate introduction of a vacuum that could impede the piston's motion.

Figure 4:
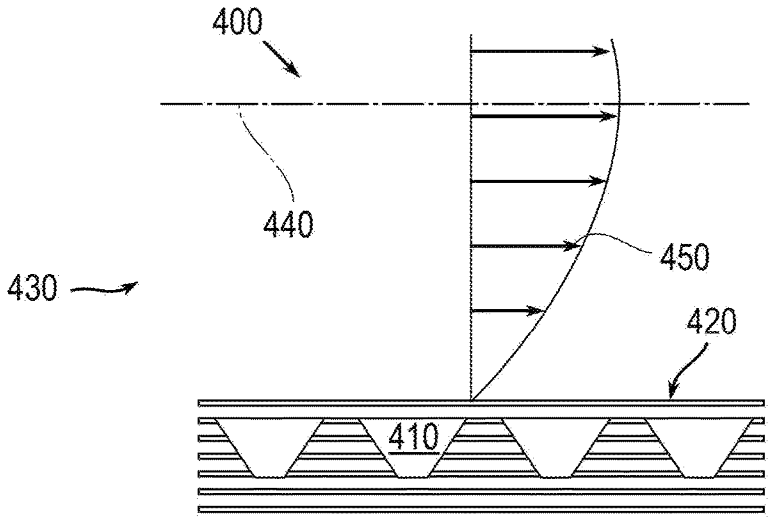
FIG. 4 is a schematic view of axisymmetric boundary layer.

FIG. 4 shows a schematic view 400 of fluid interaction with an impermeable, solid boundary 410 with an outer surface 420, such as in the cylindrical bore 310. The surface 420 is exposed to a liquid medium 430, which travels at a finite speed. Along the centerline 440 of the medium 430, the liquid velocity reaches freestream maximum, while at the surface 420, the liquid has zero velocity. The velocity transition is shown as a parabolic profile that denotes the boundary layer 450 in the medium 430.

Figure 5:
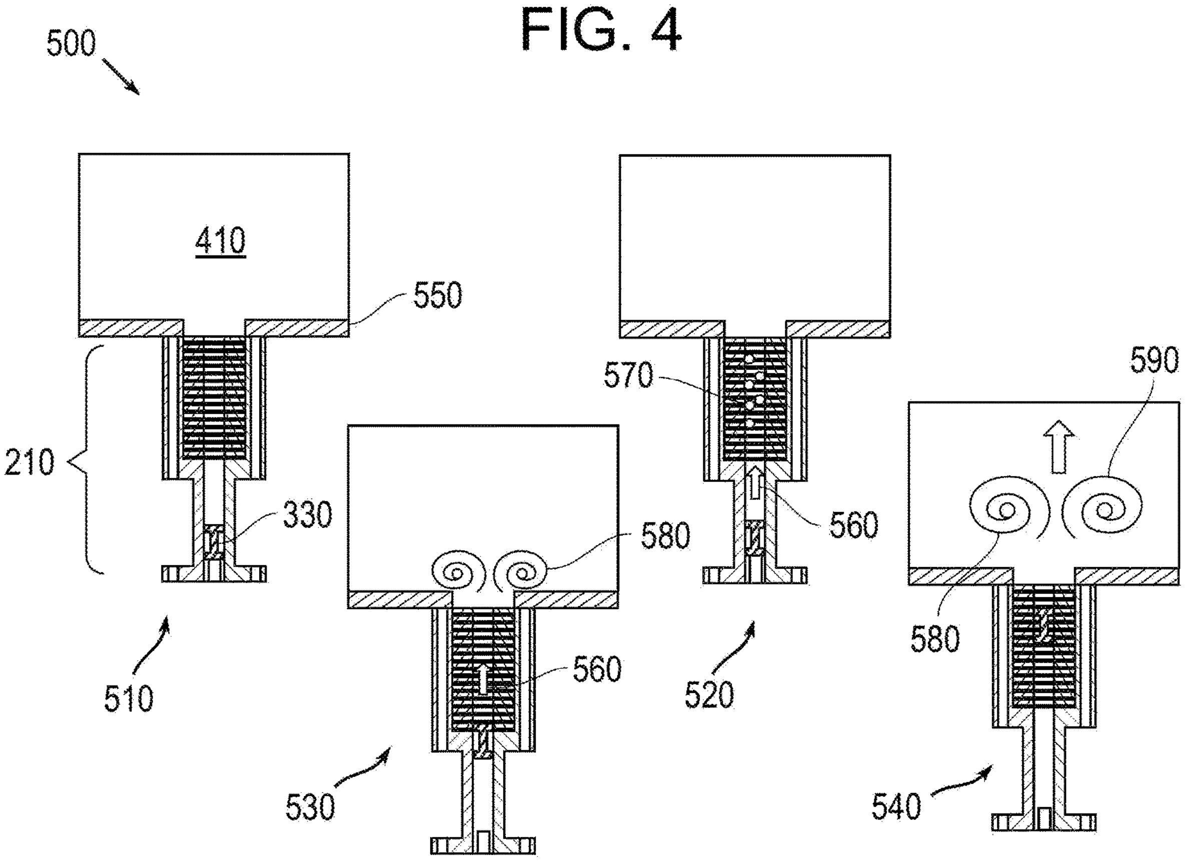
FIG. 5 is an elevation time-lapse view of the vortex generator producing stable annular vortices via electrolysis.

FIG. 5 shows an elevation cross-section view 500 of the exemplary vortex generator 210 in operation in four time-lapse intervals. Condition 510 denotes an initial rest state. Condition 520 denotes the piston 330 moving forward in the bore 310. Condition 530 denotes the piston 330 moving forward towards the stack 160. Condition 540 denotes the piston 330 moving into cavity 175. The generator 210 attaches from underneath a reservoir 550 to contain a liquid 430 medium.

As the piston 330 moves axially upward 560, that portion of the liquid medium 430 within the bore 310 is displaced in condition 520. Concurrently, the fluid motion smoothly transports bubbles 570 produced on the surface 420 in the bore 310 via electrolysis by the stack 160. The bubbles 570 coalesce to form an annular gas ring 580 that fills the core of the vortex ring 590. The vortex ring 590 and gas core 580 travel as a unit away from the device 210 at a finite velocity.

The vorticity generated in the boundary layer 450 produces a vortex ring 590 within the medium 430.

Within a channel such as the bore 310, a viscous liquid 430 can be translated by the piston 330. As this liquid 430 moves near any solid body 410 (such as the bore 310), a boundary layer 450 develops. On the surface 420, the liquid 430 is stationary. Far from the body 410 within the freestream, such as adjacent the centerline 440, the fluid velocity equals that of the piston 330.

When energized, current flows between conductors as electrodes 180 and 185. This electrolysis converts liquid water into its constituent gaseous components, hydrogen ($H_2$) and oxygen ($O_2$). The piston 330 pushes upwards through the bore 310, displacing fluid in bore 310. The no-slip boundary condition occurs at the surface 420 of the bore 310, while the maximum velocity occurs along the centerline 440 of the channel. Upon reaching the end of the channel, the liquid 430 retains rotational energy in the form of "curl"—analogous to vortex shedding from airfoils. The faster liquid 430 moves laterally more readily than axially, so a vortex ring 590 forms, enveloping the slower liquid 430 shed from the boundary layer 450.

However, a stable vortex ring 590 with a gas core 580 is difficult to produce by conventional techniques. Usually, gas must be physically injected into the boundary layer 450 to yield a hollow core vortex. This induces "instabilities" in the vortex ring 590 and limits translational (i.e., axial) distance traveled. Exemplary embodiments generate a hollow core vortex ring 590. Moreover, vortex rings 590 produced in the exemplary manner can be rapidly expanded, and thereby weaponized.

Presumably from the four-segment elevation view 500, the chamber 140 is mounted to a reservoir 550 containing an electrically conductive liquid 430 from underneath.

(a) the system is at rest with the piston 330 at the bottom of the bore 310 adjacent the base 120 at condition 510.

(b) electric current is applied to the anode/cathode stack 160—the piston 330 begins translation through the bore 310 (axially upward towards the reservoir 550) at condition 520—fluid 430 in the bore 310 is displaced, and a boundary layer forms—hydrogen and oxygen bubbles 570 generated are swept along in the boundary layer 450.

(c) hydrolysis occurs on the surface 420 of the bore 310 and within the boundary layer 450 and the bubbles 570 are swept up into the liquid 430 at condition 520 at condition 530—liquid 430 at the upper end of the channel (where the housing 110 terminates) begins "roll up" into a bound vortex ring 490.

(d) the piston 330 reaches end of travel at condition 540—bubbles 570 generated within bore 310 have migrated into ring core 580 in reservoir 550 and eventually the vortex ring 590 pinches off and translates into reservoir 550.

Exemplary embodiments exploit a hydrogen/oxygen gas mixture produced by electrolysis from the stack 160. Liquid 430 displaced by piston 330 "rolls up" into a vortex ring 590. Gas bubbles 570 in bore boundary layer 450 constitute the vortex ring core. There is no mechanical injection, or release of, the gases that comprise the ring core 580. The exemplary technique generates stable vortex rings 590 that have a gaseous core 580, such as the nucleating bubble torus. Preferably long propagation of the vortex ring 590 is possible by such generation. For electrolysis of water, the gaseous core 580 can exothermally combust when subjecting the constituent hydrogen and oxygen gases to an ignition source.

Conventional vortex rings are produced using an impulsive piston configuration. A piston in a tube bore accelerates to push the bore fluid out of the tube. The viscous boundary layer within the tube "rolls up" into a toroidal structure, such as a vortex ring 590. For exemplary embodiments by contrast, to achieve a gaseous ring core 580, gas is directly generated in the form of bubbles 570 within the boundary layer 450 of the bore 310.

For exemplary embodiments, the principle of electrolysis, by which an electric potential between two or more electrodes 180 and 185 is used to decompose water into its constitutive components—hydrogen and oxygen, both gases—directly converts water into gas within the boundary layer 450. Thus, no tubes or injection ports are required for exemplary embodiments. This contrasts with conventional configurations, which act to perturb the boundary layer 450 and disrupt the flow, leading to less stable vortex rings 590.

The exemplary system can be used in any transport process. There are several products in the market that "break up" rock underwater using cavitating vortex rings 590. If the explosive gas core 580 of the exemplary embodiments can be ignited, much more mechanical energy can be applied onto the rock, exacerbating disintegration. Vortex rings 590 denote a fundamental topic of fluid dynamics.

Many researchers in academia and industry study these processes. New applications for vortex rings 590 are under development. Exemplary embodiments was developed to study a topic funded by in-house laboratory independent research (ILIR). By not injecting gas into the tube bore 310, the flow is not perturbed, leading to longer propagation times. Also, the core 580 is ignitable, which opens up a new area of research. The only alternatives known are conventional techniques previously described that employ mechanical forms of gas injection.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A method for producing a gaseous core vortex ring in a liquid medium, said method comprising:

concatenating pairs of insulated anode and cathode rings into a stack;

inserting said stack into a vertically oriented chamber;

disposing a cylindrical cavity below said chamber;

inserting a piston into said cavity;

connecting said chamber to the medium; and raising said piston to displace the medium while said stack produces an annular bubble that induces the vortex ring.

2. The method according to claim 1, wherein the medium is water and said stack separates the medium into hydrogen and oxygen gas.

3. The method according to claim 1, wherein said anode and cathode rings have a respective difference potential of at least 1.23 V.

4. A device for producing a vortex ring in a liquid medium, said device comprising:

a housing containing a cylindrical chamber oriented vertically;

a column having a cylindrical cavity disposed beneath said chamber;

a piston contained within and movable along said cavity, said piston being movable by an external influence; and a stack of interweaving anode and cathode rings, each ring having a circular through-hole, wherein said stack is contained within said chamber, said cavity and said through-hole in said each ring forming a continuous circular channel, and said influence causes said piston to translate from said cavity into said stack to induce motion in the medium for said stack to generate a gas bubble around which the vortex ring forms.

5. The device according to claim 4, wherein the medium is water and said anode and cathode rings separate said water into hydrogen and oxygen by electrolysis.

6. The device according to claim 4, wherein said anode and cathode rings comprise copper.

7. The device according to claim 4, wherein said anode and cathode rings have a respective difference potential of at least 1.23 V.

8. The device according to claim 4, wherein an insulator ring separates each said anode and cathode ring from each other in said stack.

9. The device according to claim 8, wherein said insulation ring comprises a non-conductive polymer.

10. The device according to claim 8, wherein said insulation ring comprises polytetrafloroethylene.

11. The device according to claim 8, wherein said insulation ring comprises polyvinyl chloride.

* * * * *